United States Patent
Lin et al.

(10) Patent No.: US 11,427,065 B2
(45) Date of Patent: Aug. 30, 2022

(54) MOUNTING STRUCTURE FOR WATERPROOF RUBBER STRIP OF VEHICLE COVER

(71) Applicant: Hangzhou Golden Sun Auto Parts Co., LTD., Hangzhou (CN)

(72) Inventors: Chenshan Lin, Hangzhou (CN); Shaoyong Zheng, Hangzhou (CN); Jinqin Fu, Hangzhou (CN); Xue'e Wang, Hangzhou (CN); Xiaohong Tang, Hangzhou (CN)

(73) Assignee: Hangzhou Golden Sun Auto Parts Co., LTD., Hangzhou (CN)

( * ) Notice: Subject to any disclaimer, the term of this patent is extended or adjusted under 35 U.S.C. 154(b) by 9 days.

(21) Appl. No.: 17/139,394

(22) Filed: Dec. 31, 2020

(65) Prior Publication Data
US 2022/0153106 A1 May 19, 2022

(30) Foreign Application Priority Data
Nov. 13, 2020 (CN) .......................... 202022634144.6

(51) Int. Cl.
*B60J 10/34* (2016.01)
*B60J 10/26* (2016.01)
*B60J 10/90* (2016.01)
*B60J 10/36* (2016.01)
(Continued)

(52) U.S. Cl.
CPC .............. *B60J 10/34* (2016.02); *B60J 7/141* (2013.01); *B60J 10/21* (2016.02); *B60J 10/26* (2016.02); *B60J 10/36* (2016.02); *B60J 10/90* (2016.02)

(58) Field of Classification Search
CPC ... B60J 10/34; B60J 7/141; B60J 10/21; B60J 10/90
See application file for complete search history.

(56) References Cited

U.S. PATENT DOCUMENTS 5,137,323 A * 8/1992 Gross ...................... B60J 10/70
52/204.597
5,330,246 A * 7/1994 Bernardo ................. B60J 7/068
160/130

(Continued)

FOREIGN PATENT DOCUMENTS

CN        111645501 A    9/2020
WO     WO-9521749 A1 * 8/1995 .............. B60J 10/16

*Primary Examiner* — Marcus Menezes
(74) *Attorney, Agent, or Firm* — Schwegman Lundberg & Woessner, P.A.

(57) ABSTRACT

A mounting structure for a waterproof rubber strip of a vehicle cover includes a vehicle cover and an edge rubber strip. A flat adhesive surface is provided on the edge rubber strip. The edge rubber strip is sealingly adhered and fixed with the vehicle cover through the flat adhesive surface. The mounting structure further includes a first joint. The edge rubber strip is provided with an L-shaped engaging portion. The first joint is fixedly mounted on the vehicle cover. An end of the engaging portion is embedded in the first joint, and the engaging portion is located between the first joint and the vehicle cover. In addition, the edge rubber strip is provided with the L-shaped engaging portion, and the first joint cooperates with the vehicle cover to clamp the engaging portion, so that the edge rubber strip is sealed and fixed on the vehicle cover.

7 Claims, 4 Drawing Sheets

(51) Int. Cl.
*B60J 10/21* (2016.01)
*B60J 7/14* (2006.01)

(56) References Cited

U.S. PATENT DOCUMENTS

| | | | | |
|---|---|---|---|---|
| 5,636,893 | A * | 6/1997 | Wheatley | B60J 7/141 |
| | | | | 296/100.09 |
| 5,746,858 | A * | 5/1998 | Finkbeiner | B60J 10/34 |
| | | | | 52/204.597 |
| 6,106,941 | A * | 8/2000 | Fisher | C09J 7/38 |
| | | | | 427/208.4 |
| 8,544,934 | B2 * | 10/2013 | Maimin | B60J 7/102 |
| | | | | 296/100.12 |
| 8,672,388 | B2 * | 3/2014 | Rusher | B60J 7/085 |
| | | | | 296/100.09 |
| 9,718,336 | B2 * | 8/2017 | Tanaka | B60J 10/34 |
| 9,994,094 | B2 * | 6/2018 | Ortmueller | B60J 10/70 |
| 10,322,624 | B2 * | 6/2019 | Facchinello | B60J 7/106 |
| 11,110,780 | B2 * | 9/2021 | Hüttel | B62D 25/06 |
| 11,142,056 | B2 * | 10/2021 | Miaoyi | B60J 11/06 |
| 11,247,547 | B2 * | 2/2022 | Schröferl | B60J 10/90 |
| 2001/0001972 | A1 * | 5/2001 | Soldner | C03C 27/048 |
| | | | | 156/71 |
| 2006/0078702 | A1 * | 4/2006 | Velard | C09J 7/38 |
| | | | | 428/40.1 |
| 2017/0001499 | A1 * | 1/2017 | Facchinello | B60P 7/02 |
| 2019/0100087 | A1 * | 4/2019 | Facchinello | B60J 7/141 |
| 2021/0031607 | A1 * | 2/2021 | Schröferl | B60J 7/04 |
| 2021/0046812 | A1 * | 2/2021 | Hawkins | B32B 5/18 |
| 2021/0309088 | A1 * | 10/2021 | Nellen | B60J 10/90 |

* cited by examiner

MOUNTING STRUCTURE FOR WATERPROOF RUBBER STRIP OF VEHICLE COVER

CROSS-REFERENCE TO RELATED APPLICATIONS

This Non-provisional application claims priority under 35 U.S.C. § 119(a) to Chinese Patent Application No. 202022634144.6 filed on Nov. 13, 2020, the entire contents of which are hereby incorporated by reference in their entirety.

TECHNICAL FIELD

The disclosure relates to the field of automobile parts, in particular to a mounting structure for a waterproof rubber strip of a vehicle cover.

BACKGROUND ART

Nowadays, in order to transport goods in rainy and snowy weather, a pickup truck generally is chosen to be installed with a cover on its cargo bed for waterproofing. A fully-embedded vehicle cover used on the cargo bed of the pickup truck is provided in Patent CN111645501A, in which a rubber strip is provided to protect against water. However, in this full-embedded vehicle cover, the rubber strip is only fixed at an edge of the vehicle cover and fills a gap between the cargo bed and the vehicle cover to protect against water. In fact, water can easily penetrate through a slit between the vehicle cover and the rubber strip, with a waterproof effect.

SUMMARY

In view of the above problems, the present disclosure provides a mounting structure for a waterproof rubber strip of a vehicle cover.

Technical schemes adopted in the disclosure is as follows.

A mounting structure for a waterproof rubber strip of a vehicle cover includes a vehicle cover and an edge rubber strip. A flat adhesive surface is provided on the edge rubber strip. The edge rubber strip is sealingly adhered and fixed with the vehicle cover through the flat adhesive surface. The mounting structure further includes a first joint. The edge rubber strip is provided with an L-shaped engaging portion. The first joint is fixedly mounted on the vehicle cover. An end of the engaging portion is embedded in the first joint, and the engaging portion is located between the first joint and the vehicle cover.

In this structure, the edge rubber strip includes a flat adhesive surface therewith, and is sealingly adhered to the vehicle cover through the flat adhesive surface, so that the water does not leak from a slit between the edge rubber strip and the vehicle cover. In addition, the edge rubber strip is provided with an L-shaped engaging portion, and the first joint cooperates with the vehicle cover to clamp the engaging portion, so that the edge rubber strip is sealed and fixed on the vehicle cover, with a good sealing performance.

Optionally, the mounting structure further includes a second joint which is fixed on the vehicle cover. An end of the engaging portion is embedded in the second joint, and the engaging portion is located between the second joint and the vehicle cover.

In the above structure, the second joint is further added for a stability of a connection between the edge rubber strip and the vehicle cover, so as to ensure that the edge rubber strip always pushes against the vehicle cover.

Optionally, the first joint and the second joint are both provided with grooves, and the first joint and the second joint are engaged with the engaging portion through their respective grooves.

The grooves are set to ensure that the first joint and the second joint are more stably matched with the engaging portion on the edge rubber strip. Specifically, the first joint is further provided with a lower edge surface, and the lower edge surface also abuts against the engaging portion.

Optionally, the first joint and the second joint are fixed on the vehicle cover by screws.

Optionally, the vehicle cover includes profiles and connecting rubber strips, two adjacent profiles are sealingly connected by the connecting rubber strips, and the profiles are parallel to each other.

Specifically, the profile is provided with a fitting groove and the connecting rubber strip is provided with a fitting part. The fitting part is embedded in the fitting groove, and the profile and the connecting rubber strip can be rotated with each other. Specifically, the profile can be a metal rod.

Optionally, the edge rubber strip is perpendicular to the profiles, and the engaging portion is perpendicular to the profiles.

Optionally, a length of the edge rubber strip is equal to a length of the profile.

Optionally, the engaging portion is integrally formed with the edge rubber strip.

The disclosure presents advantages that: the edge rubber strip includes the flat adhesive surface therewith, and is sealingly adhered to the vehicle cover through the flat adhesive surface, so that the water does not leak from the slit between the edge rubber strip and the vehicle cover. In addition, the edge rubber strip is provided with the L-shaped engaging portion, and the first joint cooperates with the vehicle cover to clamp the engaging portion, so that the edge rubber strip is sealed and fixed on the vehicle cover, with a stable structure and a good sealing performance.

Figure 1:
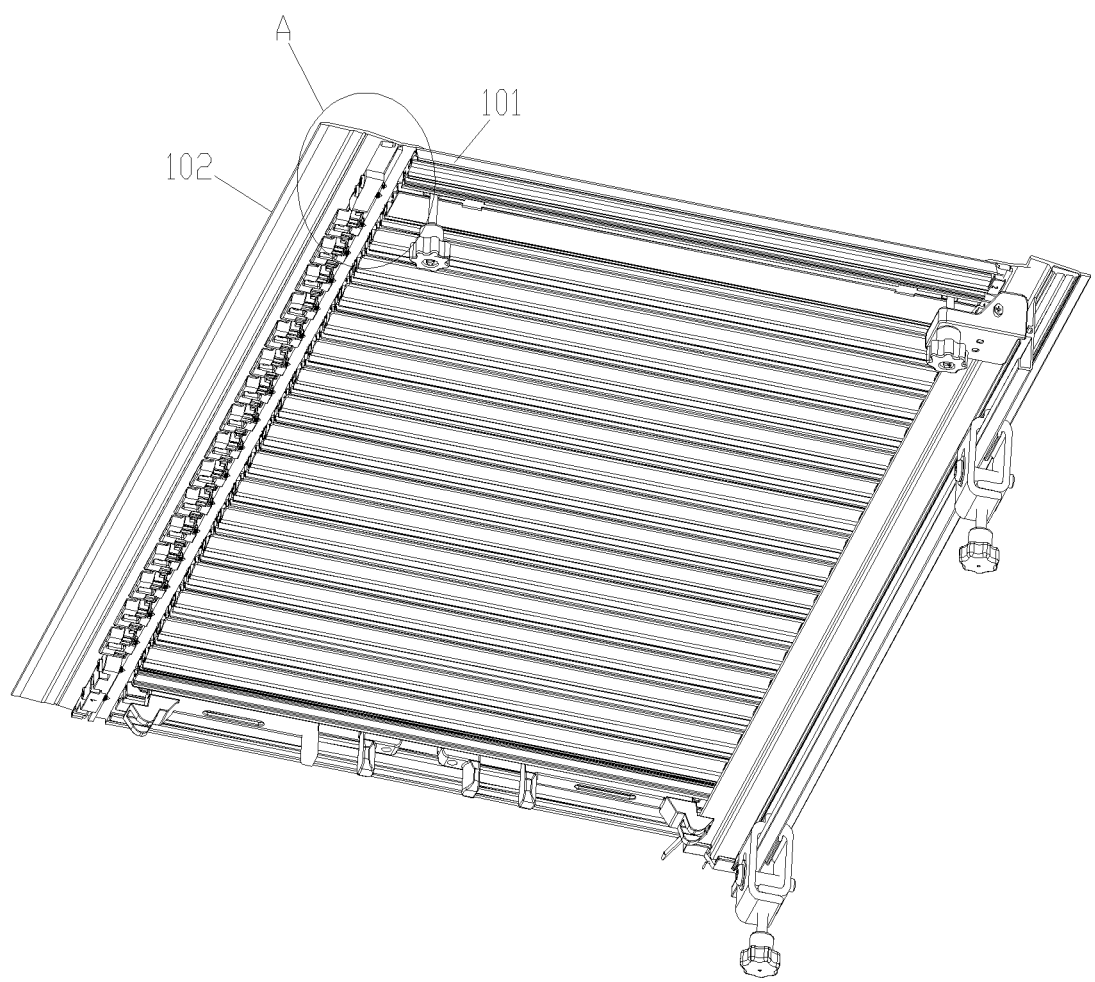
FIG. 1 is a schematic diagram of a mounting structure for a waterproof rubber strip of a vehicle cover according to the disclosure.

Reference numerals in the figures are: 101. Profile, 10101. Fitting Groove, 102. Edge Rubber Strip, 10201. Flat Adhesive Surface, 10202. Engaging Portion, 103. Connecting Rubber Strip, 10301. Fitting Part, 104. First Joint, 10401. Lower Edge Surface, 105. Screw, 106. Second Joint, 107. Groove.

DETAILED DESCRIPTION

The present disclosure will be described in detail with reference to the accompanying drawings.

Figure 2:
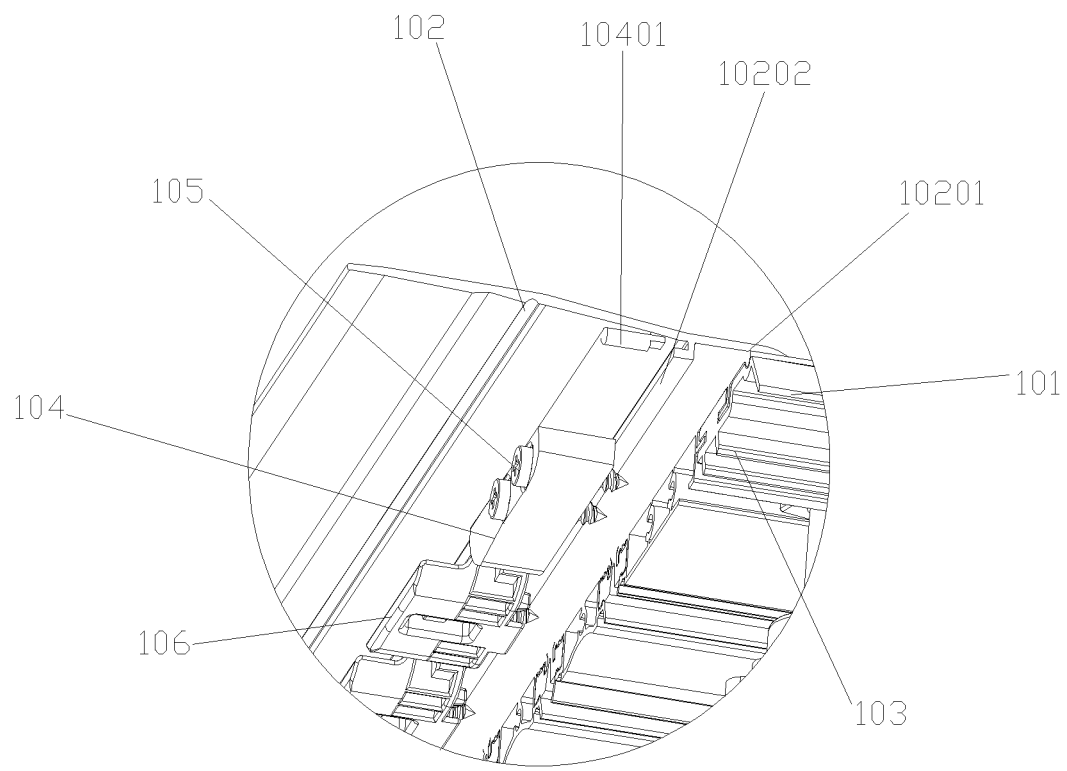
FIG. 2 is an enlarged schematic diagram at A in FIG. 1.

As shown in FIGS. 1 and 2, a mounting structure for a waterproof rubber strip of a vehicle cover includes a vehicle cover and an edge rubber strip 102. A flat adhesive surface 10201 is provided on the edge rubber strip 102. The edge rubber strip 102 is sealingly adhered and fixed with the vehicle cover through the flat adhesive surface 10201. The mounting structure further includes a first joint 104. The edge rubber strip 102 is provided with an L-shaped engaging portion 10202. The first joint 104 is fixedly mounted on the vehicle cover. An end of the engaging portion 10202 is embedded in the first joint 104, and the engaging portion 10202 is located between the first joint 104 and the vehicle cover.

In this structure, the edge rubber strip 102 includes a flat adhesive surface 10201 therewith, and is sealingly adhered to the vehicle cover through the flat adhesive surface 10201, so that the water does not leak from a slit between the edge rubber strip 102 and the vehicle cover. In addition, the edge rubber strip 102 is provided with an L-shaped engaging portion 10202, and the first joint 104 cooperates with the vehicle cover to clamp the engaging portion 10202, so that the edge rubber strip is sealed and fixed on the vehicle cover, with a good sealing performance.

Figure 4:
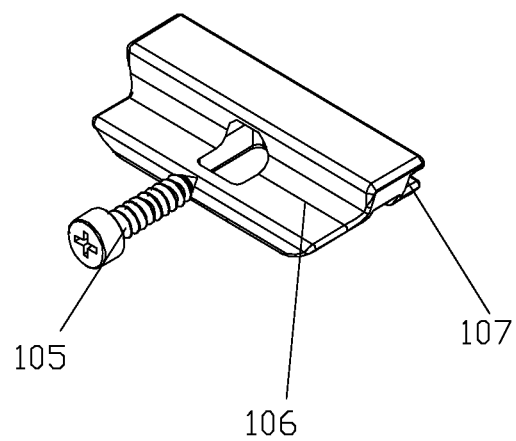
FIG. 4 is a schematic diagram of a structure of a second connection block.

As shown in FIGS. 1, 2 and 4, the mounting structure further includes a second joint 106 which is fixed on the vehicle cover. An end of the engaging portion 10202 is embedded in the second joint 106, and the engaging portion 10202 is located between the second joint 106 and the vehicle cover.

In the above structure, the second joint 106 is further added for a stability of a connection between the edge rubber strip 102 and the vehicle cover, so as to ensure that the edge rubber strip 102 always pushes against the vehicle cover.

Figure 3:
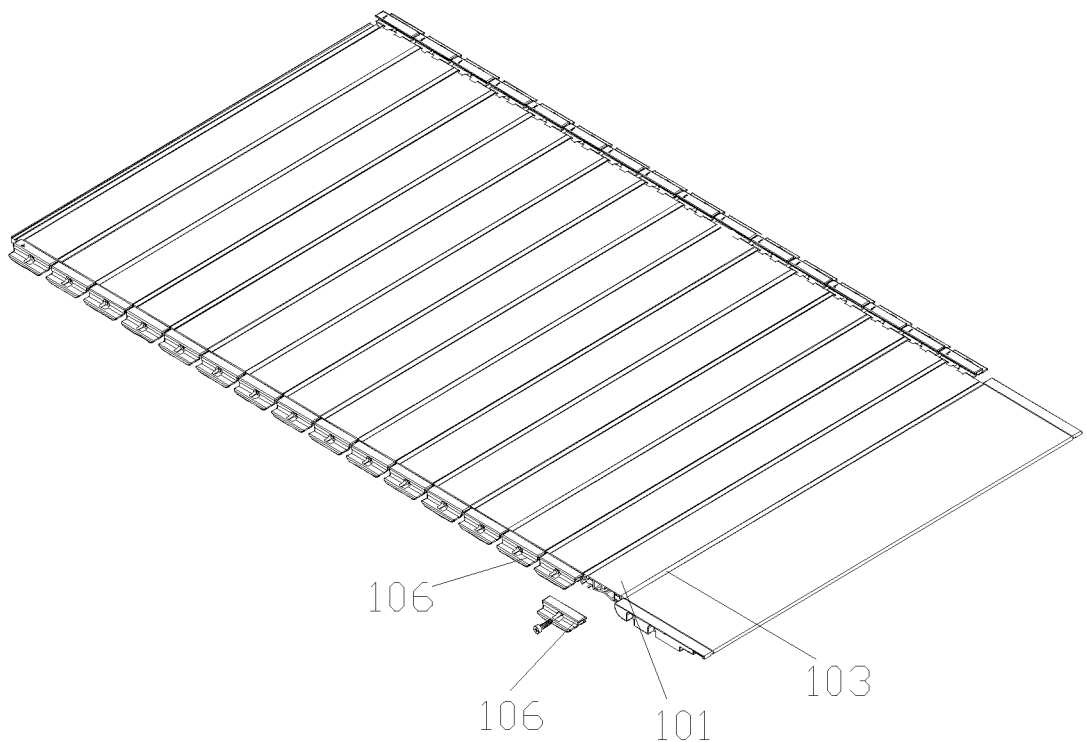
FIG. 3 is a schematic diagram of a connection between a second joint and a vehicle cover according to the disclosure.

As shown in FIGS. 3 and 4, the first joint 104 and the second joint 106 are both provided with grooves 107, and the first joint 104 and the second joint 106 are engaged with the engaging portion 10202 through their respective grooves 107.

The grooves 107 are set to ensure that the first joint 104 and the second joint 106 are more stably matched with the engaging portion 10202 on the edge rubber strip 102. Specifically, the first joint 104 is further provided with a lower edge surface 10401, and the lower edge surface 10401 also abuts against the engaging portion 10202.

As shown in FIGS. 1 and 2, the first joint 104 and the second joint 106 are fixed on the vehicle cover by screws 105.

Figure 5:
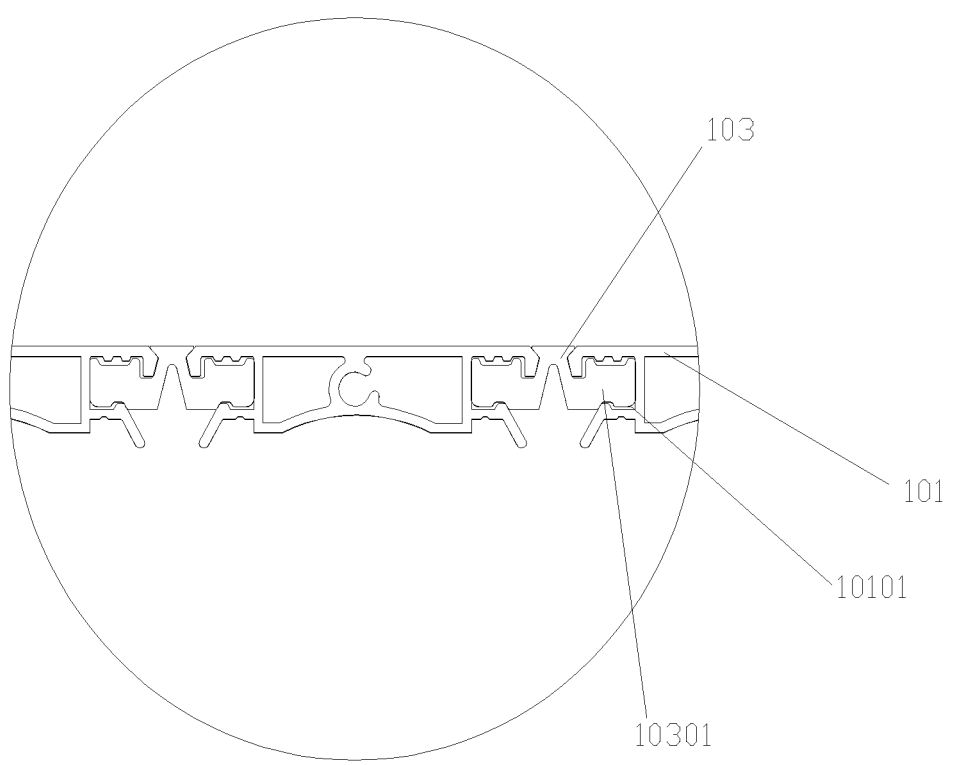
FIG. 5 is a schematic diagram of a matching relationship between profiles and connecting rubber strips.

As shown in FIGS. 1 and 5, the vehicle cover includes profiles 101 and connecting rubber strips 103, two adjacent profiles 101 are sealingly connected by the connecting rubber strips 103, and the profiles 101 are parallel to each other.

Specifically, the profile 101 is provided with a fitting groove 10101 and the connecting rubber strip 103 is provided with a fitting part 10301. The fitting part 10301 is embedded in the fitting groove 10101, and the profile 101 and the connecting rubber strip 103 can be rotated with each other. Specifically, the profile 101 can be a metal rod.

As shown in FIG. 1, the edge rubber strip 102 is perpendicular to the profiles 101, and the engaging portion 10202 is perpendicular to the profiles 101.

As shown in FIG. 1, a length of the edge rubber strip 102 is equal to a length of the profile 101.

As shown in FIG. 2, the engaging portion 10202 is integrally formed with the edge rubber strip 102.

The above is only preferred embodiments of the present disclosure, which does not limit a protection scope of the present disclosure. Any equivalent transformation made with the specification of the present disclosure, which is directly or indirectly applied to other related technical fields, is included within the scope of the disclosure.

What is claimed is:

1. A mounting structure for a waterproof rubber strip of a vehicle cover comprising the vehicle cover and two edge rubber strips on two sides of the cover, a flat adhesive surface being provided on the edge rubber strips, the edge rubber strips being sealingly adhered and fixed with the vehicle cover through the flat adhesive surface, wherein the mounting structure further comprises a pair of first joints and a plurality of pairs of second joints on each of the two sides of the vehicle cover, wherein the edge rubber strips are respectively provided with an L-shaped engaging portion, the first joints and second joints are fixedly mounted on the vehicle cover, an end of the engaging portion is embedded in the first joints and the second joints, and the engaging portion is located between the first joints and the second joints and the vehicle cover.

2. The mounting structure for the waterproof rubber strip of the vehicle cover according to claim 1, wherein the first joints and the second joints are both provided with grooves, and the first joints and the second joints are engaged with the engaging portion through their respective grooves.

3. The mounting structure for the waterproof rubber strip of the vehicle cover according to claim 1, wherein the first joints and the second joints are fixed on the vehicle cover by screws.

4. The mounting structure for the waterproof rubber strip of the vehicle cover according to claim 1, wherein the vehicle cover comprises profiles and connecting rubber strips, two adjacent profiles being sealingly connected by the connecting rubber strips, and the profiles being parallel to each other.

5. The mounting structure for the waterproof rubber strip of the vehicle cover according to claim 4, wherein the edge rubber strips are perpendicular to the profiles, and the engaging portion is perpendicular to the profiles.

6. The mounting structure for the waterproof rubber strip of the vehicle cover according to claim 4, wherein a length of each of the edge rubber strips are equal to a length of the profile.

7. The mounting structure for the waterproof rubber strip of the vehicle cover according to claim 1, wherein the engaging portion is integrally formed with the edge rubber strips.

\* \* \* \* \*